April 23, 1946.  F. G. SCHWEISTHAL  2,399,147
LUBRICANT DISPENSING VALVE
Filed March 1, 1944  4 Sheets-Sheet 1
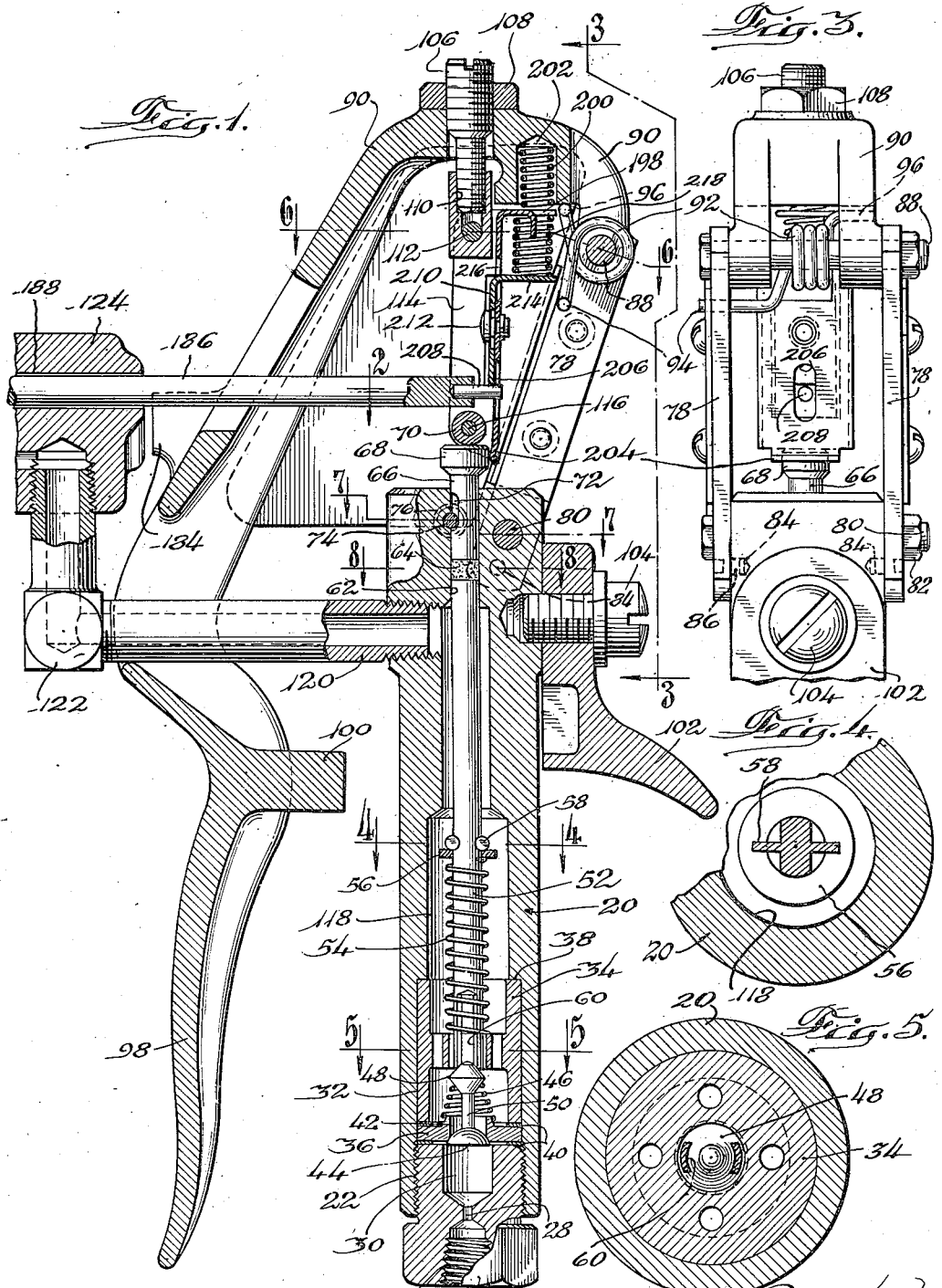

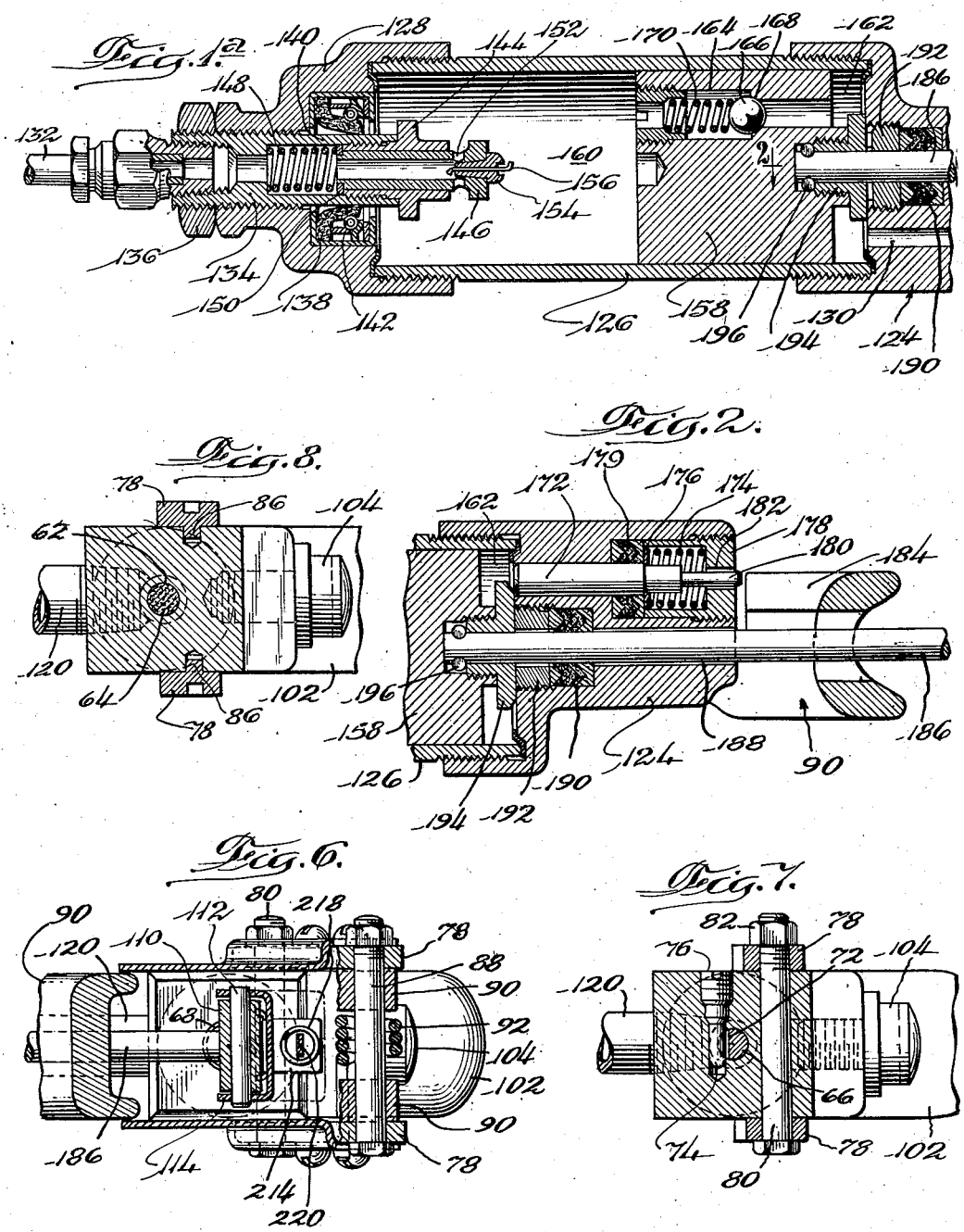

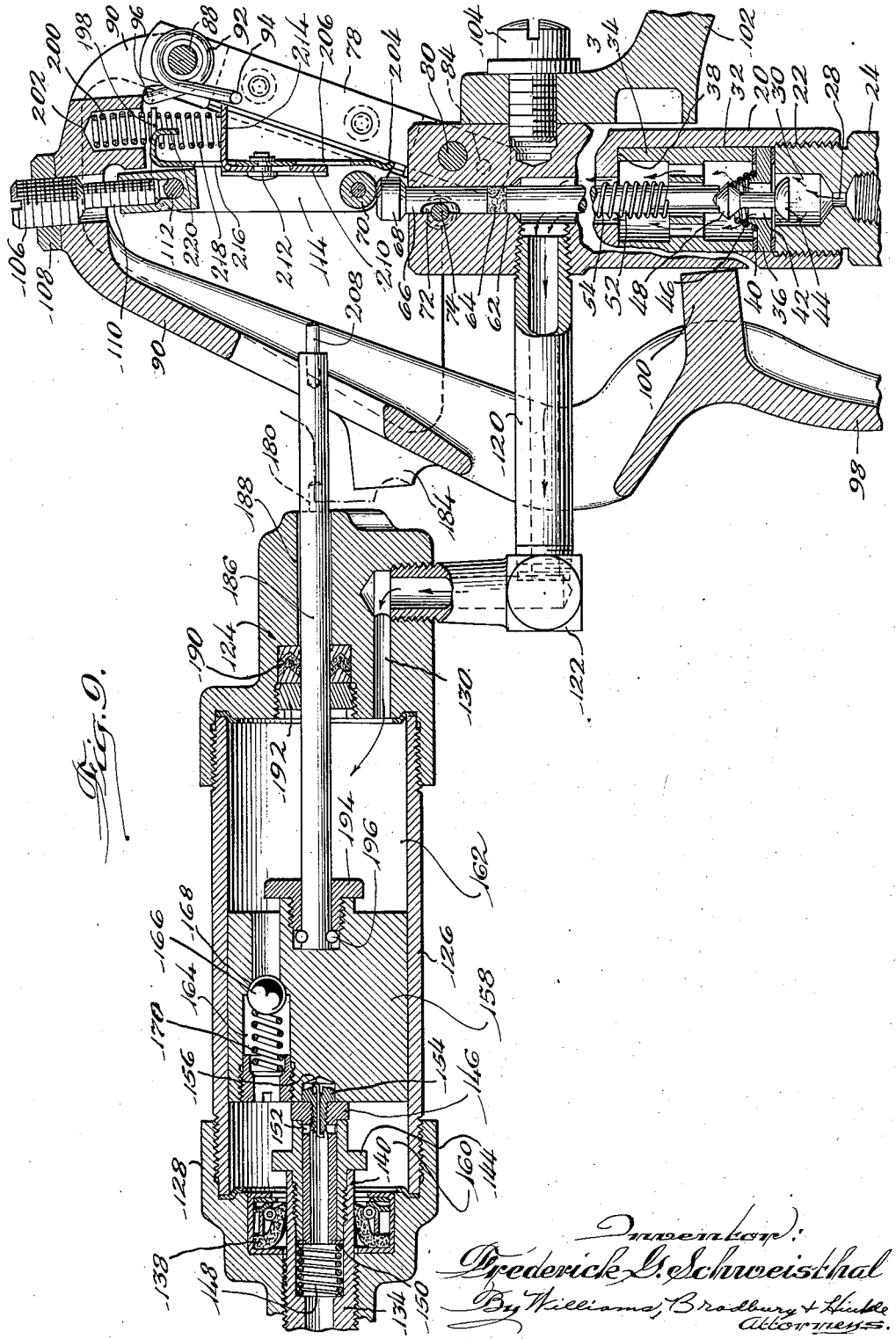

April 23, 1946.　　F. G. SCHWEISTHAL　　2,399,147
LUBRICANT DISPENSING VALVE
Filed March 1, 1944　　4 Sheets-Sheet 4
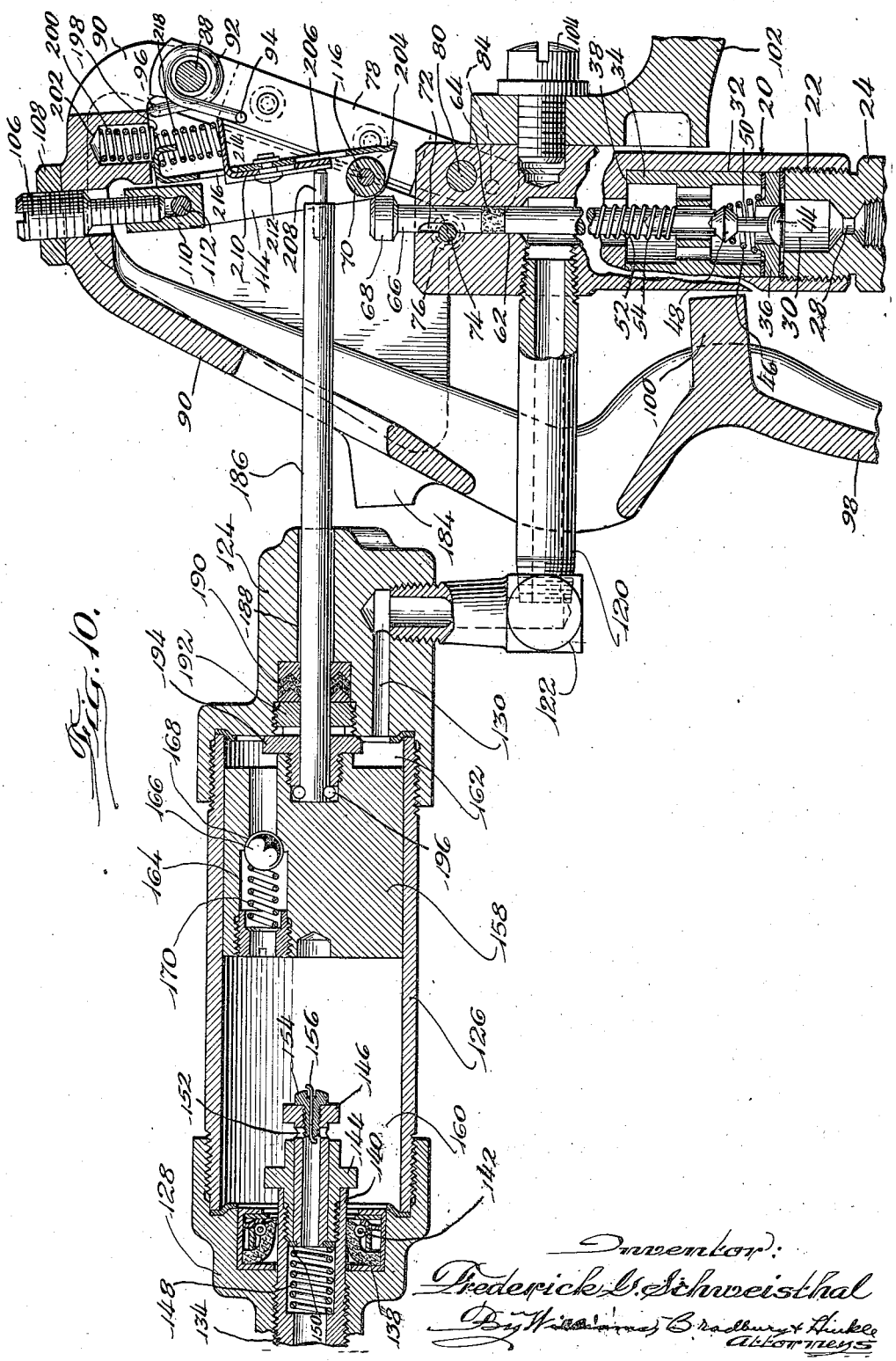
Inventor:
Frederick G. Schweisthal
By Williams, Bradbury & Hinkle
Attorneys Patented Apr. 23, 1946

2,399,147

UNITED STATES PATENT OFFICE 2,399,147

LUBRICANT DISPENSING VALVE

Frederick G. Schweisthal, Skokie, Ill., assignor to Stewart-Warner Corporation, Chicago, Ill., a corporation of Virginia Application March 1, 1944, Serial No. 524,533

9 Claims. (Cl. 222—335)

My invention relates to lubricant dispensing valves and more particularly to a valve which dispenses a measured quantity of lubricant for each operation of the valve.

It is common to provide fractional horsepower electric motors with oil reservoirs which are designed to contain a predetermined quantity of oil and which should not be filled above the proper oil level established by the manufacturer. Such motors are manufactured by mass production methods and it is necessary to fill the reservoirs of these motors with oil before they leave the factory. At present there is no quick and satisfactory means for supplying exactly the right quantity of oil to the reservoirs of such motors and an object of my invention is to provide a new and improved lubricant dispensing valve particularly adapted for this purpose.

Another object of my invention is to provide a lubricant dispensing valve which is capable of general use for dispensing measured quantities of lubricant.

Another object of my invention is to provide a new and improved lubricant dispensing valve which is adjustable to discharge any desired quantity of lubricant for each operation of the valve.

Another object of my invention is to provide a new and improved lubricant dispensing valve which automatically prevents misuse to supply a quantity of lubricant other than that for which the valve is set.

Another object of my invention is to provide a new and improved lubricant dispensing valve of the metering type which is of simple construction, inexpensive to manufacture, reliable and durable.

Other objects and advantages will become apparent as the description proceeds.

In the drawings:

Figs. 1 and 1A together constitute a vertical sectional view through a lubricant dispensing valve embodying a preferred form of my invention;

Fig. 2 is a partial, horizontal, sectional view through the metering means and is taken on the line 2—2 of Figs. 1 and 1A;

Fig. 3 is a partial, rear elevation and is taken on the line 3—3 of Fig. 1;

Fig. 4 is an enlarged, transverse, sectional view taken on the line 4—4 of Fig. 1;

Fig. 5 is an enlarged, transverse, sectional view taken on the line 5—5 of Fig. 1;

Fig. 6 is a generally horizontal, sectional view taken on the irregular line 6—6 of Fig. 1;

Fig. 7 is a partial, sectional view taken on the line 7—7 of Fig. 1;

Fig. 8 is a partial, horizontal, sectional view taken on the line 8—8 of Fig. 1;

Fig. 9 is a view similar to that of Figs. 1 and 1A but showing the parts in a different position; and Fig. 10 is a view similar to Fig. 9 but showing the parts in a third position.

Referring to Figs. 1 and 1A, it will be seen that my lubricant dispensing valve comprises a tubular body 20 which is threaded as at 22 to receive the threaded upper end of a plug 24. The plug 24 has a pipe thread 26 whereby the valve body may be attached to the discharge conduit of any suitable or conventional type of lubricant compressor. The plug 24 has bores 28 and 30 which serve to connect the discharge conduit with the lower end of the tubular body 20. The body 20 has a bore 32 in which a guide member 34 and valve seat 36 are located.

These parts are clamped between a shoulder 38 and the plug 24. Gaskets 40 are preferably located on opposite sides of the valve seat 36 to prevent escape of lubricant therearound. The valve seat 36 has a port 42 which is normally closed by a valve 44. This valve is urged toward seating position by a spring 46 confined between the valve seat 36 and a head 48 attached to a valve stem 50.

The valve 44 is moved to open position by a valve rod 52 slidable in the body 20 and having its lower end guided by the guide member 34. The valve rod 52 is normally held in elevated position by a spring 54 confined between the guide member 34 and a metal washer 56 which rests against ears 58 pinched out of the valve rod 52. The lower part of the valve rod 52 is preferably bifurcated, as indicated at 60, so that the extreme lower ends of this rod telescope slightly over the tapered upper end of the valve head 48, as clearly shown in Figs. 1 and 5.

The upper end of the valve rod 52 is located in a bore 62 in the upper end of the body 20 and engages a packing disk 64 which prevents escape of lubricant from the interior of the body 20 by way of the bore 62. This packing disk is confined between the upper end of the valve rod 52 and an operating rod 66 which slides in the bore 62 and has a head 68 engaged and moved by roller 70 forming part of certain handle mechanism which I shall presently describe. The operating rod 66 has a recess 72 into which the pin-like end 74 of a screw 76 projects, as most clearly shown in Fig. 7. This screw constitutes a stop means for limiting axial movement of the operating rod 66.

A pair of links 78 are attached to the upper end of the valve body 20 by a bolt 80 provided with the usual nut 82. The body 20 is provided with opposed bores 84 into which pressed-out portions 86 of links 78 project, as most clearly shown in Fig. 8, and this construction prevents pivoting of the links 78 about the bolt 80. A second bolt 88 is mounted in the upper ends of the links 78 and constitutes a pivot pin for a handle 90. A torsion spring 92 is wound about the central portion of the bolt 88.

One end 94 of spring 92 is located in a bore in one of the links 78 and a second end 96 engages the handle 90 to urge the latter toward the open position shown in Fig. 1. The handle 90 has a grip portion 98 located opposite the body 20 and a stop lug 100 engageable with the body 20 to limit movement of the grip portion 98 towards said body. The body 20 and grip portion 98 are adapted to be gripped in a hand of the operator and the body 20 is preferably provided with a rest 102 attached to the body by screw 104 and adapted to engage the upper portion of the operator's hand.

A two-diameter adjusting screw 106 is threaded into the upper end of the handle 90 and is locked in place by a nut 108. The smaller part of the screw 106 is threaded into a block 110 which is pivotally connected by pivot pin 112 to the upper end of a U-shaped thrust member 114, as most clearly shown in Fig. 6. The lower end of the thrust member 114 carries the pin 116 on which the roller 70 is mounted. This thrust member 114 serves to transmit force from the handle 90 to the operating rod 66 to force this rod, valve rod 52 and valve 44 downwardly against the tension of springs 54 and 46 and thereby admit lubricant to the passage 118 in the valve body 20.

The upper end of this passage 118 communicates with a pipe 120 threadedly attached at one end to the upper end of the valve body 20. The other end of the pipe 120 is secured to a nipple 122 threaded into a cap 124 of a measuring cylinder 126 whose other end is closed by a second cap 128. A passage 130 connects the nipple 122 with the interior of the measuring cylinder so that oil may flow through the valve body 20, pipe 120, nipple 122 and passage 130 into the measuring cylinder when the valve 44 is opened.

The measuring cylinder is provided with an outlet spout 132 which can be inserted into the reservoir opening of the electric motor and through which the oil or other lubricant is discharged into the motor reservoir. This spout is attached to a tubular member 134 adjustably threaded into the cap 128 and locked in adjusted position by a lock nut 136. The position of the tubular member 134 determines the volume of lubricant discharge from the measuring cylinder in a manner which I shall hereinafter describe. Leakage around the tubular member 134 is prevented by a hat washer 138 of leather or other suitable material which engages a cylindrical portion 140 of the tubular member. An annular spring 142 urges the hat washer into sealing engagement with the cylindrical portion 140.

The inner end of the tubular member 134 has a guiding sleeve 144 threadedly attached thereto. This guiding sleeve carries a slidable valve member 146 which is urged toward the open position shown in Fig. 1A by a spring 148. A washer 150 attached to the inner end of the valve member 146 engages the sleeve 144 to limit outward movement of the valve member so that the ports 152 normally project beyond the end of the guiding sleeve 144 to connect the interior of the tubular valve member with the interior of the right hand end of the cylinder 126. The head of the valve member 146 is provided with a plug 154 having a bore therethrough which is partially closed by a pin 156 providing a restricted passage through which the oil may slowly seep as hereinafter explained.

A piston 158 is located in the cylinder 126 and divides this cylinder into two variable chambers 160 and 162. This piston has a by-pass 164 located therein and this by-pass is normally closed by a ball valve 166 which is urged against its seat 168 by a light spring 170. This spring offers only sufficient resistance to the flow of oil through the by-pass to build up a pressure in the chamber 162 sufficient to overcome the frictional resistance of the piston 158. When handle 90 is moved to open valve 44, oil flows into chamber 162 and moves piston 158 to the position shown in Fig. 9. It will be noted from this figure that the forward face of the piston has engaged valve member 146 and moved it to closed position. This prevents further flow of lubricant out of the chamber 160 and prevents further forward movement of the piston 158. In other words, the discharge stroke of the piston 158 and the volume of oil discharged by such stroke are determined by the position of the tubular member 134 which can be adjusted as heretofore explained to vary this stroke to give any desired volume of discharge.

It is essential that the piston 158 complete its discharge stroke if my new and improved lubricant dispensing valve is to discharge the predetermined quantity of lubricant for each operation. I have, accordingly, provided means to insure completion of this discharge stroke even though the handle 90 be released immediately after the discharge stroke of the piston 158 is initiated. This means comprises a plunger 172 (Fig. 2) whose left hand end is exposed to the fluid pressure in the chamber 162. This plunger is normally held in the position shown in Fig. 2 by a light spring 174 confined between a washer 176 resting against a shoulder provided by the plunger 172 and a plug 178 threaded into the cap 124. Sealing means 179 prevents leakage of lubricant around the plunger 172.

The plunger 172 has a reduced right hand end 180 slidable in a bore 182 in the plug 178 and normally in alignment with a boss 184 forming an integral part of the handle 90. As soon as the handle is moved sufficiently to open valve 44, boss 184 moves downwardly of alignment with reduced end 180 of plunger 172 and lubricant flowing into chamber 162 moves plunger 172 to the right, as viewed in Fig. 2. This rightward movement of the plunger 172 causes its reduced end 180 to project into the path of boss 184, thereby preventing handle 90 from returning to valve closing position and insuring completion of the discharge stroke of the measuring piston 158. In Fig. 9, I have clearly indicated in dot and dash lines the extended position of the reduced end 180 of the plunger 172 and the relationship between this reduced end and the normal or rest position of boss 184.

The piston 158 is provided with a piston rod 186 which slides in a bore 188 in the cap 124. Packing 190 is provided to prevent leakage of fluid around the piston rod 186 and this packing is held in place by a tubular nut 192 threaded into the cap 124. The piston rod 186 is attached to the piston 158 by a second tubular nut 194 threaded to the piston 158 and engaging ears 196 pinched up from the material of the piston rod 186. This piston rod 186 makes the right hand end of the piston 158 of smaller effective area than the left hand end of this piston.

When the piston 158 has reached the forward limit of its stroke as shown in Fig. 9, oil flows through the bypass 164 into chamber 160 and builds up a pressure in this chamber almost equal to the pressure in the chamber 162. The piston 158 does not make a pressure-tight seal with valve member 146 so that the entire left hand end of the piston 158 is exposed to the pressure in the chamber 160. The area on the left hand end of the piston 158 is somewhat greater than the area on the right hand end of this piston and with valve 146 closed, chamber 160 immediately becomes a pressure chamber and because of differential areas, piston 158 moves to the right to return the piston to its initial position and, during this return stroke of the piston, fluid flows from chamber 162 through bypass 164 into chamber 160. In addition to functioning as a means for reducing the effective area of the right hand end of the piston 158, the piston rod 186 also functions as part of a means for limiting the piston 158 to a single discharge stroke for each operation of the handle 90.

The U-shaped thrust member 114 has a rearwardly extended flange 198 at its upper end. This flange is engaged by a spring 200 seated in a recess 202 formed in the handle 90 and this spring normally holds the thrust member 114 in the position shown in Fig. 1. In this position of the thrust member the roller 70 engages the head 68 of the operating rod 66 and the lower end 204 of the U-shaped thrust member engages the rear of the head 68 to prevent spring 200 from swinging the thrust member beyond the position shown in this figure.

This thrust member has a slot 206 which receives pin 208 on the end of piston rod 186 when the parts are in the normal or rest position shown in Fig. 1. When the handle 90 is moved to the operative position shown in Fig. 9 and piston 158 starts its discharge stroke, the pin 208 is withdrawn from slot 206 and from beneath the lower end of a latch 210 which is slidably secured by stud 212 to the thrust member 114. The upper end 214 of the latch 210 projects rearwardly through a second slot 216 in the thrust member 114 and is acted upon by a spring 218 which urges the latch downwardly. The upper end of the spring 218 abuts the flange 198 of the thrust member 114 and is held in place by a depending finger 220 integral with such flange. Downward movement of the latch 210 under the thrust of its spring 218 is limited by stud 212.

Upon return of the piston 158 the pin 208 of piston rod 186 engages latch 210 and moves the lower end of thrust member 114 rearwardly, as clearly shown in Fig. 10, to shift roller 70 out of alignment with the head 68 of operating rod 66. This permits spring 54 to raise valve rod 52 and operating rod 66 to elevated position and at the same time spring 46 closes flow control valve 44 to shut off the supply of oil to the cylinder 126. This effectively limits piston 158 to one complete cycle of operation for each operation of the handle 90. When this handle returns to fully released position, as shown in Fig. 1, the upward motion of that part of the handle carrying the adjusting screw 106 lifts the thrust member 114 so that the lower end of latch 210 is raised above the pin 208 and roller 70 is returned to a position above the head 68 of the operating rod 66, as clearly shown in this figure. The parts cannot resume this position, however, until the right hand end 180 of plunger 172 has been withdrawn out of the path of boss 184 on handle 90. This occurs approximately one second after piston 158 has reached the extreme right hand limit of its stroke and is made possible by leakage past the piston to relieve the fluid pressure in the chamber 162.

The operation of my new and improved lubricant dispensing valve is as follows: When the various parts of the mechanism are at rest they assume the positions shown in Figs. 1 and 1A and valve 44 prevents flow of lubricant to the cylinder 126. The piston 158 has a clearance of approximately .001 to .0015 of an inch in the cylinder 126 so that fluid pressures on opposite sides of this piston are equalized. Ports 152 are open providing free communication between the left hand end of the cylinder and the spout 132 but no leakage occurs from this spout since the diameter of this spout is small enough so that air and oil will not pass therein and it provides what may be described as a capillary seal which serves to prevent leakage of oil therefrom. It is also to be noted that in this rest position of the parts the plunger 172 is in its retracted position, as best shown in Fig. 2.

The adjusting screw 106 may be rotated to provide any desired clearance between roller 70 and the head 68 of the operating rod 66. Extreme upward movement of the operating rod 66 and valve rod 52 is determined by stop pin 74. It is to be understood that normally there is slight clearance between the lower end of valve rod 52 and the head 48 of valve 44 to insure proper seating of this valve under the influence of its spring 46. The force exerted by lubricant pressure against the lower end of this valve merely tends to seat the valve more firmly.

When the handle 90 is gripped to move stop lug 100 into engagement with valve body 28, the resulting downward movement of thrust member 114 moves operating rod 66 and valve rod 52 downwardly and opens valve 44. Oil or other lubricant immediately flows past valve 44 and into chamber 162. The first effect of this inflow of lubricant is to move plunger 172 to the right and place its reduced end 180 in a position to prevent return of handle 90 to rest position until after the entire cycle of operations has been completed.

The pressure created in chamber 162 by lubricant flow thereinto moves piston 158 to the left and discharges lubricant from the spout 132. When the left hand face of piston 158 engages valve member 146, the latter is moved against the tension of its spring 148 to close ports 152. The head of this valve member then engages sleeve 144 and prevents further forward movement of the piston 158. As previously pointed out, the stroke of the piston can be varied by adjusting tubular member 134 to move sleeve 144 and valve member 146 further into or out of the cylinder 126.

As soon as forward movement of piston 158 ceases, fluid flows through bypass 164 to substantially equalize the fluid pressure in chambers 160 and 162 located on opposite sides of the piston 158. Since the effective area of the left hand end of the piston 158 is greater than that of the right hand end of this piston by an amount equal to the area of piston rod 186, fluid pressure in chamber 160 returns the piston to its initial position. As the piston 158 approaches the limit of its return movement, pin 208 on piston rod 186 engages latch 210 and swings the lower end of thrust member 114 out of alignment with operating rod 66. This permits valve 44 to close and cut off any further supply of lubricant to the cylinder 126.

As piston 158 is returning to its original position, a very slight amount of oil may flow through the restricted passage around the pin 156 in valve member 146. As soon as the piston 158 has fully returned, seepage around this pin 156 permits valve member 146 to return to the position shown in Fig. 1A and thereby reopen ports 152. Almost immediately after the piston 158 has returned to normal position, leakage between this piston and cylinder 126 relieves pressure in chamber 162 and permits spring 174 to return plunger 172 to the retracted position, shown in Fig. 2. If the handle 90 is now released it can return to normal position. This will raise the lower end of latch 210 above pin 208 and permit thrust member 114 to swing roller 70 into alignment with head 68.

From the foregoing, it will be apparent that the piston 158 can complete only one cycle of operation for each depression of the handle 90 even though this handle be held in operating position after the piston 158 has completed its return stroke. The means for preventing repeated operation of piston 158 for a single operation of the handle 90 comprises mechanism including the piston rod 186 and its pin 208 for engaging latch 210 to permit closing of the flow control valve 44 and to prevent reopening of this valve until after the handle 90 has returned to full inoperative position. Immediate release of the handle after the cycle of operations has once been initiated cannot interfere with completion of this cycle due to the plunger 172 which prevents return of the handle to normal position until after the cycle has been completed. Since this occurs approximately a second after the piston 158 has completed its return stroke, my novel mechanism may be ready for a second operation.

From the foregoing description taken in connection with the accompanying drawings, it will be apparent that I have invented a simple yet fool-proof lubricant dispensing valve which may be inexpensively manufactured and which is capable of affording long and trouble-free service. It is to be understood, however, that my invention is not limited to the particular details shown and described but may assume numerous other forms and that my invention includes all modifications, variations and equivalents coming within the scope of the appended claims.

I claim:

1. A lubricant dispensing valve of the class described comprising a tubular body adapted to be connected to a source of lubricant under pressure, a valve normally preventing lubricant flow through said tubular body, a handle for opening said valve, a measuring cylinder in fluid communication with said body, a spout for said cylinder, a piston movable in said cylinder to discharge a measured quantity of lubricant therefrom, a valve interposed between said spout and said cylinder, and a restricted bypass in said valve, to permit said valve to open inwardly of said cylinder when the latter is filled with lubricant.

2. A lubricant dispensing valve of the class described comprising a tubular body adapted to be connected to a source of lubricant under pressure, a valve normally preventing lubricant flow through said tubular body, a handle for opening said valve, a measuring cylinder in fluid communication with said body, a spout for said cylinder, a piston movable in said cylinder to discharge a measured quantity of lubricant therefrom, and means for preventing return of said handle to normal position until said piston has completed a cycle of operation.

3. A lubricant dispensing valve of the class described comprising a tubular body adapted to be connected to a source of lubricant under pressure, a valve normally preventing lubricant flow through said tubular body, a handle for opening said valve, a measuring cylinder in fluid communication with said body, a spout for said cylinder, a piston movable in said cylinder to discharge a measured quantity of lubricant therefrom, a plunger exposed to said cylinder and operated by fluid pressure therein, means provided by said plunger and handle for preventing return of said handle when said plunger is operated by said fluid pressure, and a spring for returning said plunger.

4. A lubricant dispensing valve of the class described comprising a tubular body adapted to be connected to a source of lubricant under pressure, a valve normally preventing lubricant flow through said tubular body, a handle for opening said valve, a connection between said handle and valve, a measuring cylinder in fluid communication with said body, a spout for said cylinder, a piston movable in said cylinder to discharge a measured quantity of lubricant therefrom, and means operated by return movement of said piston to permit closing of said valve independently of said handle by rendering said connection inoperative.

5. A lubricant dispensing valve of the class described comprising a tubular body adapted to be connected to a source of lubricant under pressure, a valve normally preventing lubricant flow through said tubular body, a handle for opening said valve, a measuring cylinder in fluid communication with said body, a spout for said cylinder, a piston movable in said cylinder to discharge a measured quantity of lubricant therefrom, a piston rod attached to said piston, a separable connection between said handle and valve moved to inoperative position by said piston rod, and other means for reestablishing said connection.

6. A lubricant dispensing valve of the class described comprising a tubular body adapted to be connected to a source of lubricant under pressure, a valve normally preventing lubricant flow through said tubular body, a handle for opening said valve, a measuring cylinder in fluid communication with said body, a spout for said cylinder, a piston movable in said cylinder to discharge a measured quantity of lubricant therefrom, means for preventing return of said handle until said piston has completed a full cycle of operation, and means operated by return of said piston to close said valve independently of the position of said handle.

7. In a lubricant dispensing valve of the class described, the combination of a tubular body adapted to be connected at one end to a source of lubricant under pressure, a handle pivotally attached to said body, a valve for controlling flow through said body, a spring for closing said valve, an operating rod for opening said valve, a thrust member attached to said handle and engageable with said operating rod, a measuring cylinder mounted on said body and in fluid communication therewith, a piston reciprocable in said measuring cylinder, and means carried by said piston for moving said thrust member out of engagement with said operating rod.

8. In a lubricant dispensing valve of the class described, the combination of a tubular body adapted to be connected at one end to a source of lubricant under pressure, a handle pivotally attached to said body, a valve for controlling flow through said body, a spring for closing said valve, an operating rod for opening said valve, a thrust member attached to said handle and engageable with said operating rod, a measuring cylinder mounted on said body and in fluid communication therewith, a piston reciprocable in said measuring cylinder, and means for preventing return of said handle to inoperative position while fluid pressure exists in said measuring cylinder.

9. In a lubricant dispensing valve of the class described, the combination of a tubular body adapted to be connected at one end to a source of lubricant under pressure, a handle pivotally attached to said body, a valve for controlling flow through said body, a spring for closing said valve, an operating rod for opening said valve, a thrust member attached to said handle and engageable with said operating rod, a measuring cylinder mounted on said body and in fluid communication therewith, a piston reciprocable in said measuring cylinder, said thrust member having a slot therein, a piston rod attached to said piston and having a part normally located in said slot, a slot covering latch movable to operative position in the path of said piston rod whereby return movement of said piston and piston rod shifts said thrust member to disconnect said valve from said handle, and spring means for moving said latch.

FREDERICK G. SCHWEISTHAL.